United States Patent
Beeck et al.

(10) Patent No.: US 8,047,001 B2
(45) Date of Patent: Nov. 1, 2011

(54) MEDIA MIXING INSERT FOR TURBINE BLADE IN TURBINE ENGINE

(75) Inventors: Alexander R. Beeck, Orlando, FL (US); Stefan Hoffmann, Rosenthal (DE)

(73) Assignee: Siemens Aktiengesellschaft, Munich (DE)

( * ) Notice: Subject to any disclaimer, the term of this patent is extended or adjusted under 35 U.S.C. 154(b) by 602 days.

(21) Appl. No.: 12/226,534

(22) PCT Filed: Mar. 9, 2007

(86) PCT No.: PCT/EP2007/052235
§ 371 (c)(1),
(2), (4) Date: Oct. 21, 2008

(87) PCT Pub. No.: WO2007/122040
PCT Pub. Date: Nov. 1, 2007

(65) Prior Publication Data
US 2009/0081048 A1   Mar. 26, 2009

(30) Foreign Application Priority Data
Apr. 21, 2006 (EP) ..................... 06008321

(51) Int. Cl.
*F02C 3/16* (2006.01)
*F02K 3/08* (2006.01)
*F01D 9/06* (2006.01)
*F23R 3/28* (2006.01)

(52) U.S. Cl. ........................ 60/737; 415/116; 60/39.59

(58) Field of Classification Search ............... 60/39.58, 60/735, 737, 738, 806; 415/115.116; 416/96 A, 416/96 R, 97 R, 224, 226, 231 R
See application file for complete search history.

(56) References Cited

U.S. PATENT DOCUMENTS

| | | | | |
|---|---|---|---|---|
| 3,867,068 A | * | 2/1975 | Corsmeier et al. | 416/97 R |
| 5,619,855 A | * | 4/1997 | Burrus | 60/736 |
| 5,816,049 A | * | 10/1998 | Joshi | 60/737 |
| 6,007,296 A | * | 12/1999 | Ernst et al. | 415/115 |
| 6,298,667 B1 | | 10/2001 | Glynn et al. | |
| 6,328,532 B1 | * | 12/2001 | Hahnle | 416/97 R |
| 6,402,471 B1 | * | 6/2002 | Demers et al. | 416/97 R |
| 6,672,072 B1 | * | 1/2004 | Giffin, III | 60/782 |
| 7,413,399 B2 | * | 8/2008 | Trewin | 415/116 |
| 2005/0217270 A1 | | 10/2005 | Sampath et al. | |
| 2007/0101722 A1 | * | 5/2007 | Hoffmann | 60/772 |
| 2009/0185903 A1 | * | 7/2009 | Beeck et al. | 416/91 |
| 2011/0110777 A1 | * | 5/2011 | Abdallah et al. | 416/23 |

FOREIGN PATENT DOCUMENTS

| | | |
|---|---|---|
| DE | 2 253 843 | 5/1973 |
| EP | 1 431 543 A2 | 6/2004 |
| JP | 2000352301 A | 12/2000 |
| JP | 2003254004 A | 9/2003 |
| WO | WO 99/46540 A1 | 9/1999 |
| WO | WO 2005/003517 A1 | 1/2005 |

* cited by examiner

*Primary Examiner* — Kiesha Bryant
*Assistant Examiner* — Abbigale Boyle

(57) ABSTRACT

The invention relates to a blade for a turbine comprising a blade wall, a first channel for guiding a first medium and a second channel for guiding a second medium that can be supplied to the turbine blade separately from the first medium. In order to combine both media, which are supplied separately, into one mixture, a turbine blade has least one chamber which is arranged in the interior or in the blade wall and said chamber is connected to said channels via a respective connection line. In order to provide a particularly simple component that is economical to produce, the chamber and/or the outlet conduit are a least partially delimited and/or formed by an insert accommodated in the wall.

18 Claims, 4 Drawing Sheets

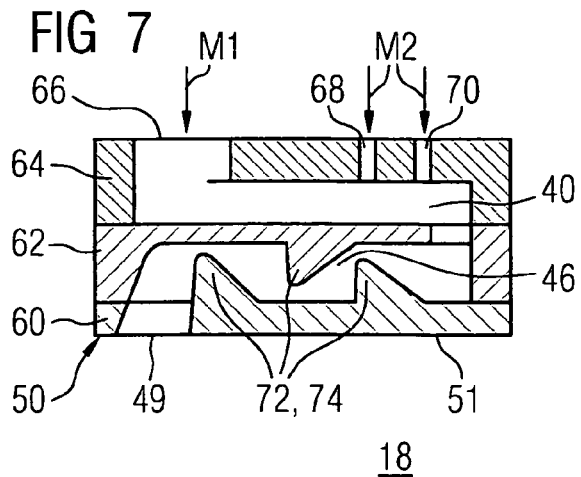
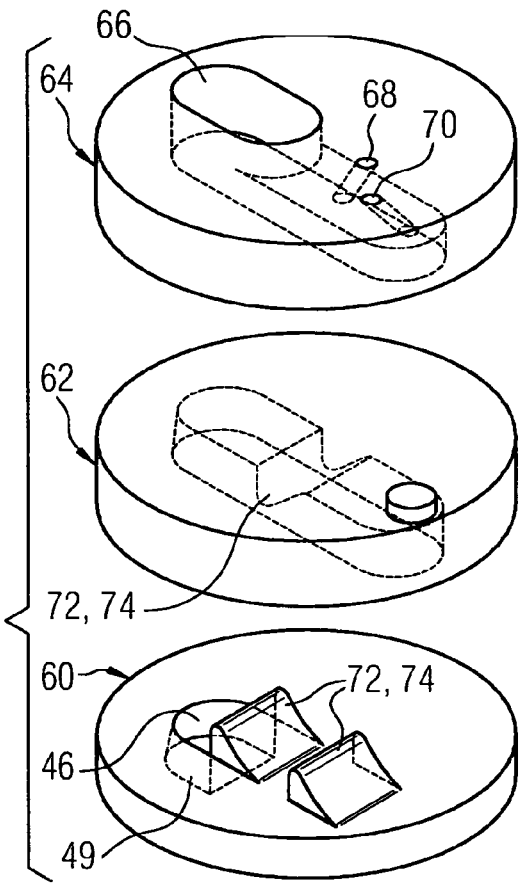
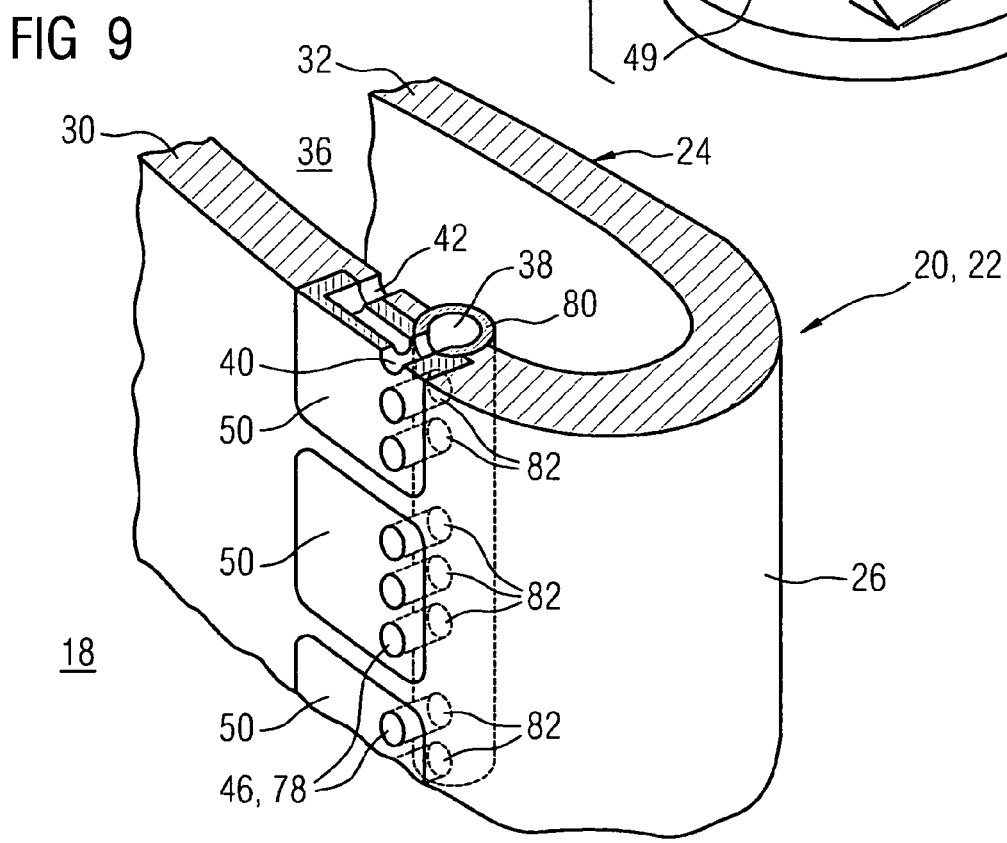

MEDIA MIXING INSERT FOR TURBINE BLADE IN TURBINE ENGINE

CROSS REFERENCE TO RELATED APPLICATIONS

This application is the US National Stage of International Application No. PCT/EP2007/052235, filed Mar. 9, 2007 and claims the benefit thereof. The International Application claims the benefits of European application No. 06008321.9, filed Apr. 21, 2006, both of the applications are incorporated by reference herein in their entirety.

FIELD OF THE INVENTION

The invention relates to a turbine blade for a turbine, with a blade wall and with a first passage for guiding a first medium and a second passage for guiding a second medium which can be fed to the turbine blade separately from the first medium, wherein for mixing the two separately feedable media to form a mixture the turbine blade has at least one chamber which is arranged on the inside or in the blade wall and is connected to the two passages via a connecting line in each case.

BACKGROUND OF THE INVENTION

Such a turbine blade is known for example from WO 2005/003517 A1. The blade walls which form the blade airfoil enclose a cavity in which cooling air can flow. Furthermore, further passages for guiding a second medium, specifically fuel, are provided in the blade wall of the turbine blade. The cooling medium which flows inside the turbine blade can discharge outwards into a hot gas space through a plurality of through-holes which extend through the blade wall of the turbine blade. In order to produce a combustible mixture still in the blade wall, connecting lines are provided in this which connect the fuel-guiding passages to the through-holes. Therefore, fuel can be mixed with cooling air still inside the through-holes and can flow as a combustible mixture into the hot gas which flows around the turbine blade. With such a turbine blade, both the hot gas which flows through the turbine and the cooling air which flows out of the turbine blade can be reheated as a result of the combustion of the mixture, which in general is carried out for increasing the level of performance of the gas turbine, for reducing the pollutant emissions and for improving the efficiency of the gas turbine, and is known as a form of carnotization. This form of subsequent energy enrichment of the hot gas in the turbine is also known as "in-situ blade reheat".

Furthermore, a combustion chamber with a multiplicity of porous heat-shield elements is known from WO 99/46540 A1, by means of which a combustible mixture can be subsequently introduced into the combustion space of a gas turbine, i.e. outside burners of the gas turbine.

A disadvantage in the case of the turbine blade which is known from the prior art relates to the production of the passages, of the chamber and of the outlet line if the turbine blade and its cavities are produced in the casting process. These cavities are to be produced comparatively expensively by means of mostly complex casting cores. For this purpose, a complexly structured casting core and/or casting shell corresponding to the desired cavity structure is required, which, however, are to be positioned securely and accurately in the casting device cost-intensively and only in a time-consuming manner so that when casting turbine blades with such complex structures an increased scrap rate ensues in most cases.

If on the other hand the cavities which are provided in the blade wall are produced by means of different coatings, then the masking of the uncoated rough components which is required for it is an especially time-consuming working step which leads to a prolonged and expensive production.

SUMMARY OF THE INVENTION

The object of the present invention is therefore the provision of a generic-type turbine blade which is to be produced in a particularly simple and cost-effective manner.

The solution which is proposed by the invention provides that the chamber and/or the outlet line are partially delimited or formed at least by means of an insert which is seated in the wall.

The invention is based on the knowledge that the turbine blade is to be produced as simply as possible if the cavities which are required inside the turbine blade, or in the wall of the turbine blade, for the guiding or for the mixing of the two media are not produced at the same time with the blade wall but in one or more working steps which can be carried out in parallel. It is proposed to assemble the turbine blade from a basic body and from at least one insert, wherein the basic body comprises the wall of the turbine blade into which the insert is inserted. The insert at least partially delimits the chamber in which the two media are mixed with each other and/or the outlet line extends through the insert. Consequently, it is possible to cost-effectively manufacture in each case by means of current production tools a simply structured basic body with a recess which is provided for the insert, and also an insert with complex hollow structures.

Consequently, a particularly simple and cost-effective turbine blade is proposed by the invention, as a result of which the scrap rate which occurs during production can be reduced. In particular, the scrap rate of the preferably cast basic body can be reduced as a result. Furthermore, it is possible to cost-effectively manufacture differently operating turbine blades in many variants by the use of different inserts in identical basic bodies on their surface.

An increased manufacturing accuracy is a further advantage of separately produced components of the turbine blade. Tolerances, both those of the basic body and those of the insert, can be selected closer without increasing the scrap rate at the same time as a result. If, for example, the complexly structured insert does not satisfy the constructional specifications with regard to its dimensions, only the insert itself and not the entire component is unusable as scrap. This saves on production costs.

Advantageous developments of the invention are disclosed in the dependent claims.

In a first development of the invention, the blade wall in its surface which faces the hot gas space has a recess with a rectangular or especially circular contour in which the insert, with a contour which corresponds to the contour of the recess, is inserted. Especially circular recesses can be particularly simply and cost-effectively produced in the blade wall, for example by means of metal-cutting methods. In the same way, an inset can be favorably produced from a cylindrical, for example solid, metal body, in which outlet lines with precise geometries can be subsequently incorporated. Recesses with essentially rectangular contours can be produced in the surface of the blade wall for example by means of milling.

Instead of a recess which is produced by means of drilling or milling, the recess which accommodates the insert, as long as the blade wall or the basic body is produced by casting, can be produced directly when casting by means of a correspondingly formed casting shell or casting core. It is also conceivable to use the insert as part of a casting core in the casting device, wherein, however, the insert is cast with the turbine blade which is to be produced and remains in this after removing the remaining casting core.

In a second advantageous development, a number of chambers are provided in the turbine blade or in the blade wall, in which at least one outlet line is associated with each chamber. As a result of this, the effect is achieved of the turbine blade having not only one but a multiplicity of outlet lines through which the mixture can be blown into the hot gas space. Consequently, a two-dimensional introduction of the mixture into the hot gas space is possible in this way.

According to a further development, swirl elements are provided in the outlet line which bring about a further particularly efficient mixing of the two media which are brought together in the chamber. This is especially advantageous when one of the two media is a fuel and the other medium represents the oxidation medium for the fuel. The oxidation medium is preferably cooling air which is provided for cooling the turbine blade or the blade wall which delimits the hot gas space. As a result of the particularly efficient and therefore homogeneous mixing of the two media, in the present case, after entry of the mixture into the hot gas space, an automatic ignition of the mixture takes place due to the temperatures which occur there, which is used for the low-emissions reheating of the hot gas which flows through the turbine, or for the reheating of the cooling air. After self-ignition of the mixture, this combusts, forming a premix flame with low emissions and by giving off heat increases the energy content of the hot gas, which leads to an increased useful output of the turbine which is equipped with the turbine blade.

In a further alternative development, it is conceivable that each chamber, and the outlet line which is associated with it in each case, is formed by means of a separate insert. This enables the use of different inserts depending upon local requirement for the outflowing mixture, or depending upon the boundary conditions which occur in the hot gas space.

A group of chambers, and the outlet lines which are connected to these chambers, can advantageously be formed by means of a single separate insert. Such a development leads to a turbine blade with a low number of inserts.

Furthermore, it is proposed that each insert can have a plurality of outlet lines which connect a common chamber to the hot gas space. This leads to especially simply configured inserts.

It is additionally proposed by the invention that the insert is formed in a plurality of sections. A multi-section insert allows the particularly cost-effective and simple production of outlet lines as long as these are to have slightly more costly inside surfaces; if, for example, turbulators or swirl elements are provided on the inside surface of the outlet line for further improved mixing-through of the reaction partners. The insert for example can be formed from a plurality of layer elements which lie one upon the other in a stacked manner and form the chamber and/or the outlet lines in the process. An insert for example can also be assembled from a plurality of elements, of which the outermost element which faces the hot gas space is formed from a porous material or from a metal foam. The insert, however, can also be formed entirely from the porous material or foam. Porous material and metal foam are particularly suited to bringing about a uniform discharge of the mixture on its surface which faces the hot gas, in the manner of a flat effusion cooling. In particular, if the mixture is suitable as a combustible mixture for reheating the hot gas which flows through the turbine, an especially low-emissions combustion of the mixture on account of an ensuing microdiffusion flame can be achieved.

It is additionally proposed that the outlet line leads to a region of the blade wall in which shock waves, which occur in the hot gas, impact. The shock waves which occur in the hot gas bring about a further improvement with regard to the mixing of the two media which are (pre-)mixed in the chamber, which in turn has an advantageous effect on the self-igniting combustion of the mixture.

If the turbine blade comprises a blade airfoil which has a suction-side blade wall and a pressure-side blade wall, wherein the blade walls extend along a chord with a chord length from a leading edge to a trailing edge and in which the outlet line leads to the surface of the suction-side blade wall in the rear third of the chord length, as seen in the flow direction of the hot gas which flows around the blade airfoil, a particularly efficient mixing, which is assisted by the swirling which occurs in the hot gas, can be carried out since the shock waves impact upon the blade airfoil of the turbine blade preferably in this region.

The blade wall of the turbine blade is preferably formed from a cast basic body. In this case, the insert which is inserted in the recess of the wall is welded or soldered to the cast basic body in order to ensure a particularly secure seating of the insert in the blade wall. Furthermore, an endless welding of the insert along the connecting contour to the basic body leads to a gastight sealing of the chamber which is at least partially delimited by the insert.

Naturally, the proposed turbine blade can also be used for the addition of fluid media other than fuel or air inside a turbine, regardless of whether it is a gas turbine or steam turbine.

The blowing out of the two media is carried out altogether in a manner which furthermore gives rise to an extremely quick mixing in the hot gas space within the shortest distance and within the shortest time. As a result, it is ensured that in the hot gas space the exceptionally homogeneous mixture of the two media automatically ignites due to the temperature which prevails in the hot gas, for reheating the hot gas which flows through the turbine. This enables an especially low-emissions combustion of the combustible mixture, which is produced in the first mixing step, by means of premix flames.

As a result of the mixing within a short reaction distance and reaction time, the effect is furthermore achieved of the mixture being combusted before leaving the annular passage-shaped hot gas space, since the energy increase of the hot gas which takes place as a result of the reheating of the hot gas or of the cooling air is only for power increase and efficiency increase of the turbine when the reheated hot gas or the reheated cooling air still flows past the rotor blades of the turbine for converting the flow energy into mechanical energy.

Advantageous developments are disclosed in the dependent claims and serve for the further explanation of the invention, referring to further advantages.

BRIEF DESCRIPTION OF THE DRAWINGS

In the drawing:

FIG. 7 shows a cross section through an insert which is assembled from stacked layer elements, FIG. 8 shows an exploded view of the insert which is shown in FIG. 7, FIG. 9 shows a partially sectioned perspective view of the leading edge of the blade airfoil of the turbine blade.

DETAILED DESCRIPTION OF THE INVENTION

Figure 1:
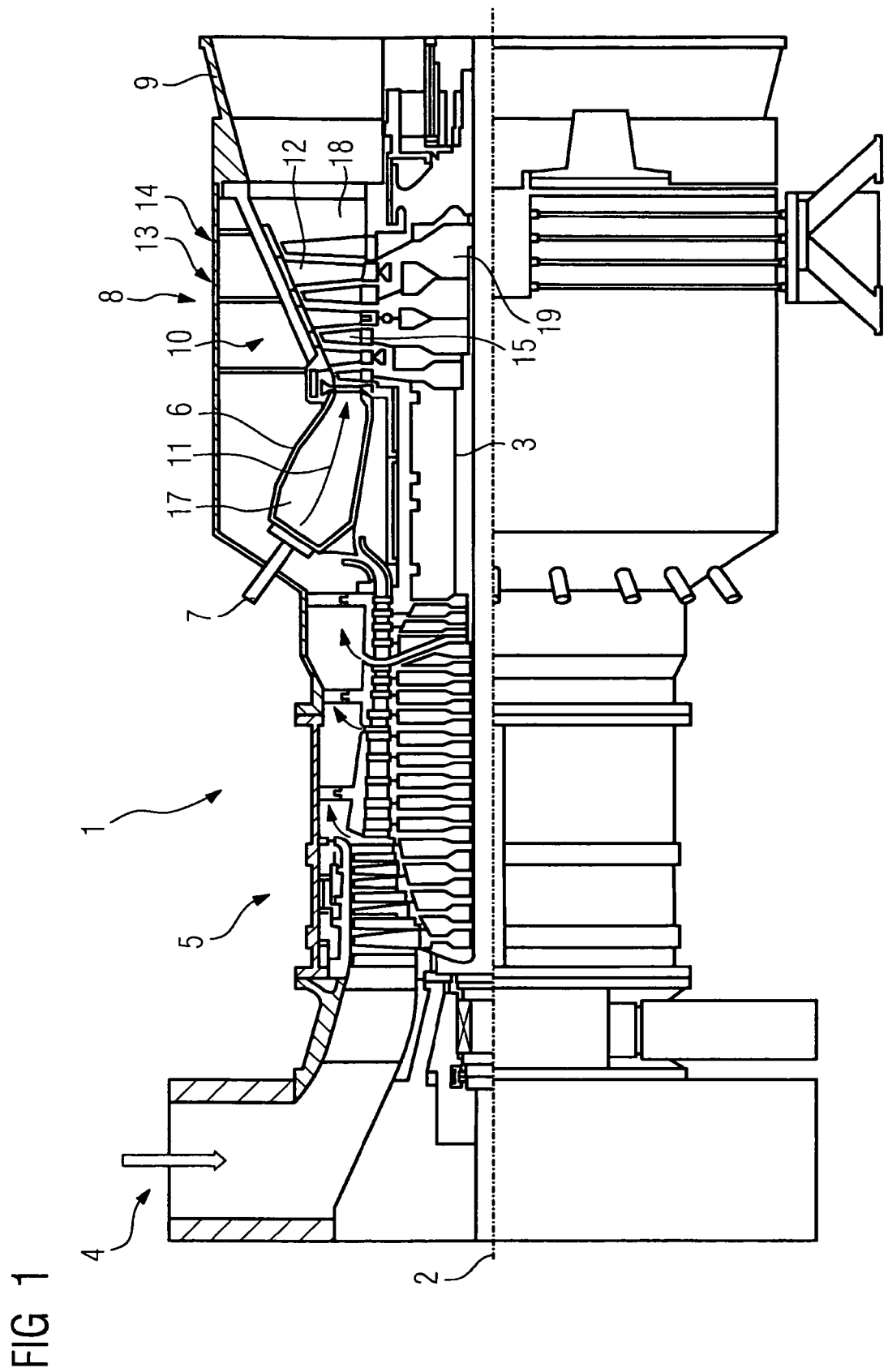
FIG. 1 shows a gas turbine in a longitudinal partial section.

FIG. 1 shows a gas turbine 1 in a longitudinal partial section. Inside, it has a rotor 3 which is rotatably mounted around a rotational axis 2 and which is also referred to as a turbine rotor. An intake duct 4, a compressor 5, a toroidal annular combustion chamber 6 with a plurality of burners 7 which are arranged rotationally symmetrically to each other, a turbine unit 8 and an exhaust gas duct 9, follow each other along the rotor 3. The annular combustion chamber 6 forms a combustion space 17 which communicates with an annular hot gas space 18. Four turbine stages 10 which are connected in series form the turbine unit 8 there. Each turbine stage 10 is formed from two blade rings. In the hot gas space 18, a row 14 which is formed from rotor blades 15 follows a stator blade row 13 in each case, as seen in the flow direction of a hot gas 11 which is produced in the annular combustion chamber 6. The stator blades 12 are fastened on the stator, whereas the rotor blades 15 of a row 14 are attached on the rotor 3 by means of a turbine disk in each case. A generator or a driven machine (not shown) is coupled to the rotor 3.

Figure 2:
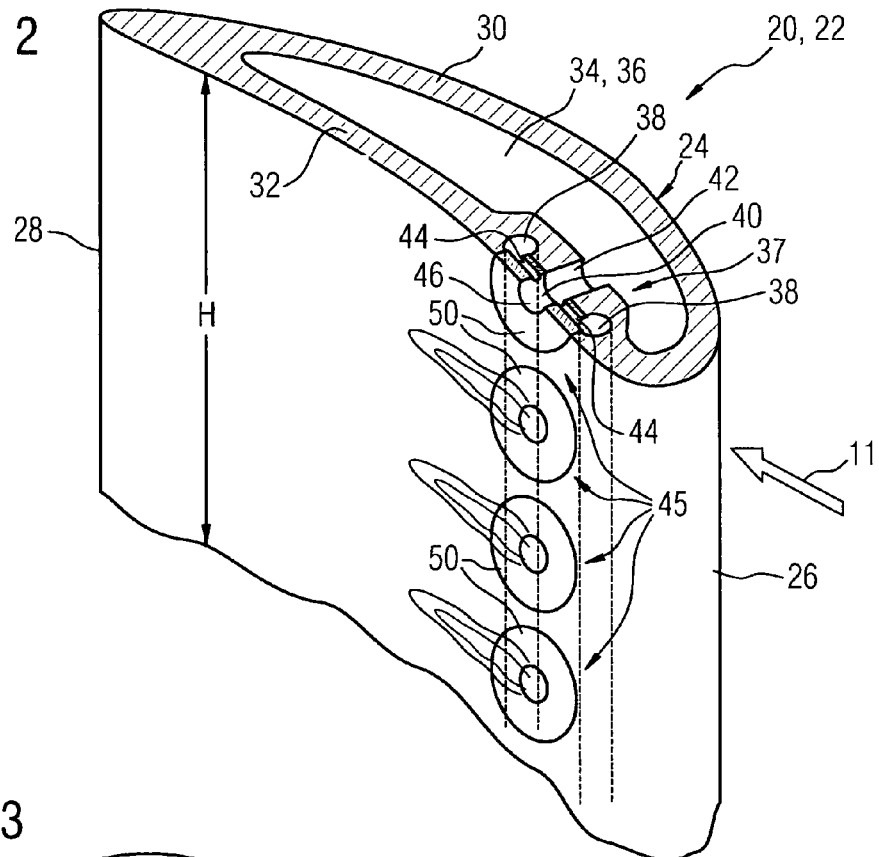
FIG. 2 shows a blade airfoil of a turbine blade as a component according to the invention in a perspective view.

In order to reheat the hot gas 11 which flows through the hot gas space 18 in the region of the turbine unit 8 according to the in-situ blade reheat process, the walls which delimit the hot gas space 18, and/or the blade airfoils of turbine blades 20 which are arranged in the hot gas space 18, are formed as components 22 in a suitable manner for it. For this purpose, FIG. 2 shows the blade airfoil 24, in the form of an airfoil profile, of the cast turbine blade 20 which can be formed as a rotor blade 15 or as a stator blade 12. The blade airfoil 24 extends along a chord with a chord length from a leading edge 26 to a trailing edge 28, as seen in the flow direction of the hot gas 11. In this case, the blade airfoil 24 has a suction-side blade wall 30 and a pressure-side blade wall 32 which connect the leading edge 26 to the trailing edge 28 in each case. A cavity 34, which is enclosed by the blade walls 30, 32, extends over the entire height H of the blade airfoil 24 and forms a first passage 36 in which a first medium M1, for example cooling air, can flow. The cooling air permanently protects material which forms the blade walls 30, 32 against the harmful influences of the hot gas 11, especially against its high temperatures, using an open cooling.

A section 37 of the pressure-side blade wall 32 is formed slightly thicker than the remaining section of the blade wall 32, as seen in cross section, so that in this thickened section 37 two second passages 38, which extend in the wall, can be formed and extend essentially over the height H of the blade airfoil 24, which height H coincides with the radial direction of the rotor 3 of the gas turbine 1.

A second medium M2, which is first to be mixed with the medium M1 directly before injecting into the hot gas 11 which flows around the blade airfoil 24, can be fed to each second passage 38. For this purpose, a mixing chamber 40 is provided, in which the two media M1, M2 which are fed separately to the turbine blade 20 are brought together for the first time.

In order to feed the first medium M1 to the chamber 40, a first connecting line 42 extends between the first passage 36 and the chamber 40. The first connecting line 42 is formed as a hole which penetrates the thickened section 37 of the pressure-side blade wall 32. In this case, the connecting line 42 in the proposed development is provided between the two second passages 38 which extend in the radial direction.

The feed of the second medium M2, for example fuel, to the chamber 40 is carried out by means of second connecting lines 44 which extend between the second passages 38 and the chamber 40. Via an outlet line 46, the mixture which is created in the chamber 40 can flow out of the turbine blade 20 and flow into the hot gas space 18 in order to increase, the efficiency of the turbine 8 by means of carnotization as a result of its combustion there.

In order to produce the aforementioned blade airfoil 24 in a particularly simple and cost-effective manner, the represented structure of the passage system 45, consisting of first and second passages 36, 38 and also first and second connecting lines 42, 44, chamber 40 and outlet line 46, is produced in a modular manner. For this purpose, the invention proposes that an insert 50 is provided in a basic body or in a blade wall 30, 32, by means of which the chamber 40 is at least partially delimited and in which the outlet line 46 is formed. In the aerodynamically curved surface of the blade airfoil 24 or in the basic body, there is a recess for the insert 50, which has no negative influence upon the strength of the component 22 or of the turbine blade 20. This especially applies when the recess is provided in a section 37 of the blade wall 32 which is thickened in cross section.

As a result of the insert 50 which is to be separately introduced, a high flexibility and accuracy for injection of the mixture into the hot gas space 18 can be combined with good producibility of the component 22.

In the turbine blade 20 which is shown in FIG. 2, a plurality of inserts 50 with a circular contour in each case, which are provided in the thickened section 37 of the blade wall 32, are inserted into recesses which correspond to them and which at least partially delimit one of the chambers 40 in each case and which features the outlet line 46 in each case. The depth of each recess is selected so that it corresponds to the thickness of the associated insert 50 so that edges which project from the blade wall 32 are avoided for aerodynamic reasons. The insert 50 can be connected along its circular contour, or even any contour, to the blade wall 32 by means of an endlessly encompassing weld seam or by soldering so that this insert is seated in the blade wall 32 in a sealed manner.

Figure 3:
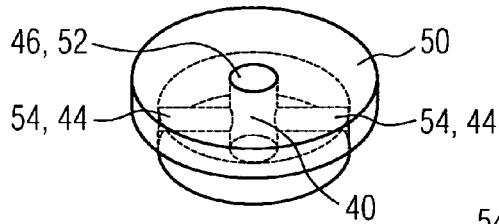
FIG. 3 shows a cylindrical insert for the blade airfoil of the turbine blade in a perspective view.
Figure 4:
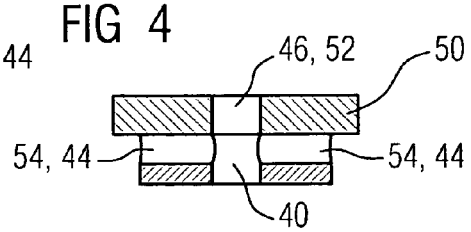
FIG. 4 shows a section through an insert according to FIG. 3.

The segment-like insert 50 which is inserted in the wall 32 is shown in perspective view in FIG. 3 and in sectioned view in FIG. 4. The insert 50 essentially comprises a cylindrical body or segment in which a concentric central hole 52 is introduced for producing the outlet line 46. Two further holes 54, which extend perpendicularly to the central hole 52, lead to this and therefore form the second connecting lines 44. Therefore, the chamber 40, in which the two media M1, M2 which flow in the turbine blade 20 are mixed for the first time, is provided inside the insert 50 and is therefore entirely delimited by the insert 50. Consequently, the connecting lines 42, 44 also merge into the chamber 40 in a stepless manner.

In this case, the outlet lines 46, which are arranged in series, are evenly distributed over the height H of the blade airfoil 24 which extends along the radial direction so that the hot gas 11, which flows perpendicularly to the row, can be evenly treated with the mixture over the entire height H of the blade airfoil 24.

With such a turbine blade 20 with the blade airfoil 24 and with a plurality of inserts 50, it is possible to create the addition and mixing of fluids comparatively simply in a turbine blade 20 without making the production by casting technique of the basic body or of the blade walls 30, 32 unnecessarily difficult.

Figure 6:
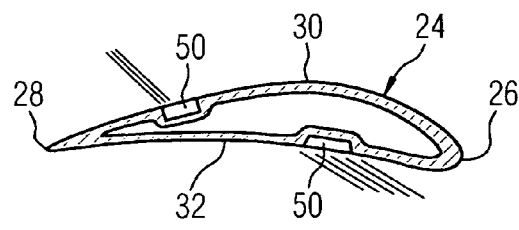
FIG. 6 shows a schematic cross section through the blade airfoil of the turbine blade.

According to FIG. 6, the inserts 50 can be provided in the region of the turbine blade 20 in which shock waves of the hot gas 11 impact upon the turbine blade 20. This is especially advantageous when the mixture is a combustible mixture which is to be further mixed due to the shock waves and which as result of the temperature which prevails in the hot gas 11 is to be combusted as a result of self-ignition for reheating the cooling air or the hot gas 11. A particularly good mixing-through of the mixture then leads to a particularly low-emissions combustion so that the energy which as a result is subsequently supplied to the hot gas 1, i.e. outside the combustion chamber, can be generated with particularly low emissions. The supplied energy can be used accordingly for power increase of the gas turbine and for increasing the efficiency.

Figure 5:
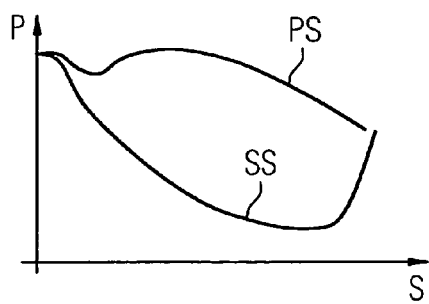
FIG. 5 shows the pressure distribution along the suction-side and pressure-side blade walls of the blade airfoil of the turbine blade.

FIG. 5 shows the pressure characteristic in the hot gas 11 along the chord length of the turbine blade 20. In this case, the characteristic line which is designated PS indicates the pressure in the hot gas 11 which occurs along the pressure-side blade wall 32, and the line which is designated SS indicates the pressure characteristic of the flow of the hot gas 11 along the suction-side blade wall 30. The inserts 50, and therefore the injection of the mixture into the hot gas 11, is carried out at suitable points, which is indicated in FIG. 6. For example, inserts 50 are provided in the rear third of the suction-side blade wall 30, measured on the distance between leading edge 26 and trailing edge 28 of the blade airfoil 24, and/or in the front third of the pressure-side blade wall 32, since in these sections vortices, for example shock waves or vortex trails, which are present in the hot gas 11 anyway, impact upon the blade walls 30, 32. In each case, the mixing behavior of the mixture with the hot gas 11 can be significantly influenced by the flow field and by the pressure field of the hot gas 11 which flows around the blade airfoil 24, depending upon positioning of the blow-in point for the mixture.

FIG. 7 shows a further insert 50 in cross section and FIG. 8 shows the insert 50 according to FIG. 7 in an exploded view. The insert 50 according to FIG. 7 comprises three cylindrical layer elements 60, 62, 64 which are arranged in a stacked manner in order to produce an especially complex passage system with the chamber 40 and the outlet line 46 in a particularly simple and cost-effective manner. The three layer elements 60, 62, 64 have differently configured recesses which, however, as long as the three layer elements 60, 62, 64 lie directly one upon the other, merge into each other in each case and form the flow path or the passage system which is shown in FIG. 7. The insert 50 for example can be inserted into the blade wall 32 or into the platform of the turbine blade 20. The layer element 64 additionally has three openings 66, 68, 70, wherein the first medium M1 can be fed to the opening 66 in the installed state and the second medium M2 can be fed to the openings 68, 70. The two media M1, M2 which flow into the insert 50, flow due to the pressure drop, to a region in which they are mixed. This region is the chamber 40 which in this case is delimited both by the layer element 64 and by the layer element 62. The mixture flows from here further along a meander-shaped passage which is delimited by the two layer elements 60, 62. The meander-shaped passage represents the outlet line 46 and leads to an opening 49 which is provided in the surface 51 of the layer element 60. The surface 51 of the layer element 60 in the installed state is exposed to the hot gas 11 so that the mixture which is produced in the chamber 40 can flow into the hot gas 11 after flowing out of the outlet line 46. The layer elements 60, 62 have differently formed mixing elements 74 or swirl elements in the style of projecting teeth 72 in order to produce the meander shape of the outlet line 46. An especially homogeneous mixing of the mixture which flows through the outlet line 46 is achieved as a result of the meander shape and as a result of the comparatively long mixing distance, i.e. the outlet line 46, which would be almost impossible within the limits of the customary production by casting technique of the blade airfoil 24. In the event that it concerns a combustible mixture, this can subsequently combust with low emissions in the hot gas space 18 for reheating the hot gas 11.

FIG. 9 shows a further development of the invention, in which there are essentially rectangular recesses in the suction-side blade wall 30 of the turbine blade 20, in which the inserts 50 which correspond to them are inserted. In each of the inserts 50 a plurality of holes 78 are provided, which on the inlet side are connected to the second passage 38, which is formed by a tube 80 inserted in the wall, and on the outlet side lead to the hot gas space 18. The tube 80, which is provided with further holes 82, was part of a casting core which after the casting of the blade airfoil 24 remains in the latter. The medium M1, which is fed to the first passage 36, flows via first connecting lines 42 into the chamber 40 which is arranged in the insert 50. The second medium M2, which discharges from the second passage 38 through the further holes 82, flows via the second connecting lines 44 into the chamber 40 and at this point is mixed with the first medium M1, which mixture which results in the process then flows through the outlet line 46 into the hot gas space 18.

Figure 10:
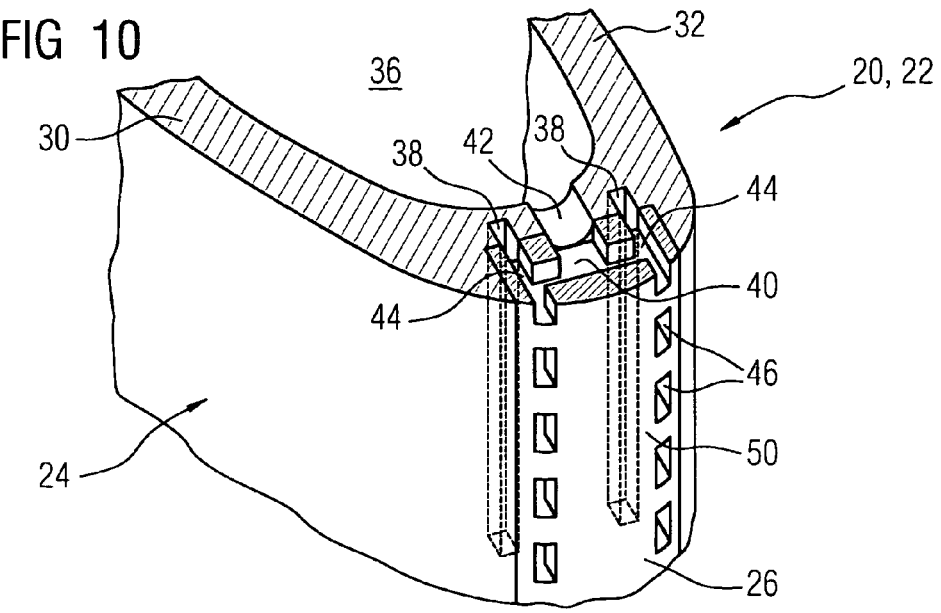
FIG. 10 shows the leading edge of the turbine blade in a sectioned perspective view.

FIG. 10 shows a further development of the invention, in which the one-piece insert 50 is inserted in the leading edge 26 of the turbine blade 20. The two media M1 and M2 are mixed in the chamber 40 which is provided in the insert 50, and in the manner which is shown in FIG. 2 can be fed to this and discharged from it.

As long as the mixture flows out at the leading edge 26 of the turbine blade for reheating the hot gas 11, a greatest possible reaction distance can be achieved since the mixture is to be combusted no later than when reaching the blade row which is arranged downstream.

Figure 11:
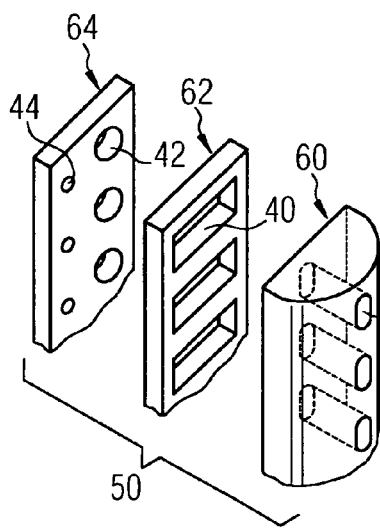
FIG. 11 shows the insert according to FIG. 12 in a perspective exploded view.

FIG. 11 shows a further insert 50, which is assembled from three layer elements 60, 62, 64, in an exploded view. By means of the layer elements 60, which are equipped with different recesses, it is possible to feed the first medium M1 and the second medium M2 separately to the chamber 40, which media are mixed in this and can be blown out through an outlet line 46 into the hot gas 11. According to FIG. 12, it is provided that the insert 50, which is formed by the three layer elements 60, 62, 64 which lie one upon the other, can be provided in the leading edge 26 of the turbine blade 20.

The layer element 64 which is to be inserted first in the turbine blade 20 has a multiplicity of drilled first and second connecting lines 42, 44. The drilled connecting lines 42, 44 can be reliably produced with increased precision compared with a cast production so that the media M1, M2 which flow out as a result can consequently be metered to meet demand.

The layer element which lies thereupon is provided with a plurality of rectangular openings which align with one of the first and one of the second connecting lines 42, 44 in each case, and which partially delimit the chamber 40 in each case. In the layer element 60 which is arranged in the turbine blade 20 on the outside, i.e. on the hot gas side, holes are provided as outlet lines 46, on the inner walls of which, those which delimit the hole, mixing elements or swirl elements can also be provided.

Figure 12:
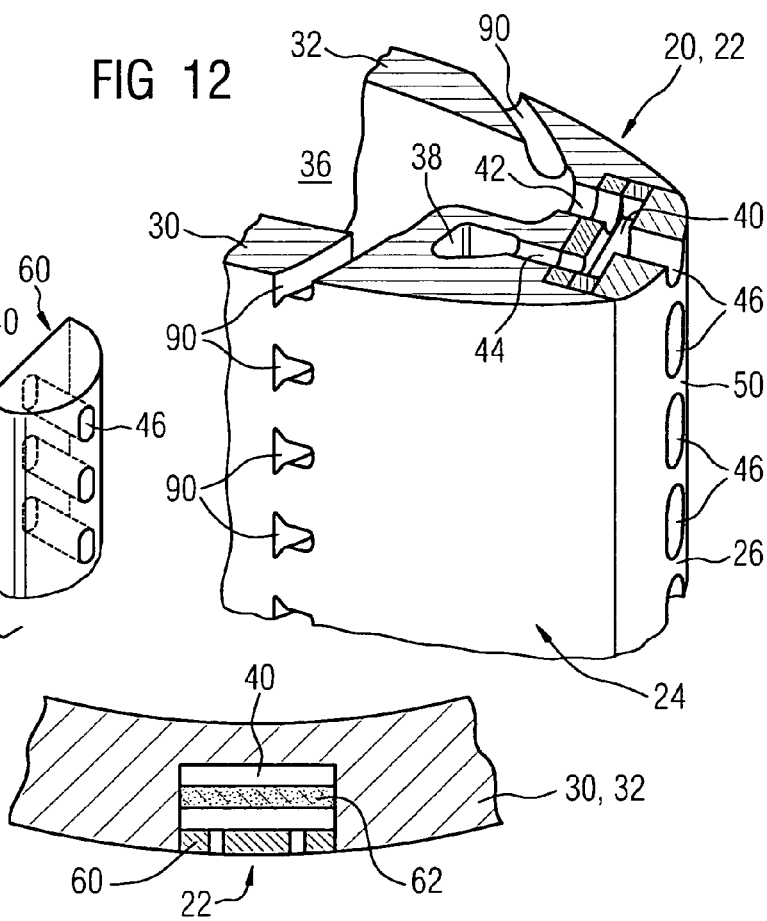
FIG. 12 shows a sectioned perspective view of the leading edge of the turbine blade with an insert which is rectangular in contour.

Other regions of the blade airfoil 24 are also suitable for accommodating such an insert 50 and for blowing out the mixture at a point other than the leading edge 26 of the turbine blade 20. Furthermore, FIG. 12 shows that openings 90, which are arranged in a row and lead through at an angle to the surface of the blade walls 30, 32 which is exposed to the hot gas 11, are in communication with the first passage 36. The medium M1, for example cooling air, which flows out through these openings 90, on account of the contoured diffusor-like shape of the openings 90, form a flat film which protects the blade surface or the blade walls 30, 32 against the hot gas 11, especially against its temperatures.

Figure 13:
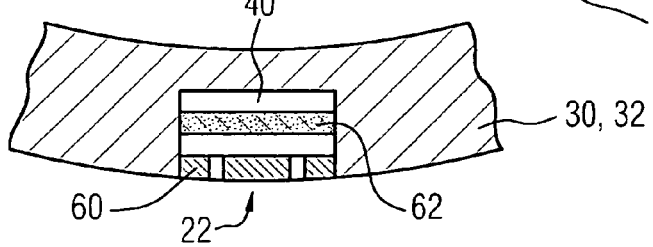
FIG. 13 shows a blade wall in cross section with a porous layer element as the insert.

FIG. 13 shows a modular insert 50 in the blade wall 30, 32 of the turbine blade 20, which insert comprises two layer elements 60, 62 which are at a distance from each other, wherein the inner layer element 62 which delimits the mixing chamber 40 consists of a porous material and the layer element 60 which is exposed to the hot gas 11 is provided as a plate-like element with openings through which the mixture which is formed in the chamber 40 can discharge.

Naturally, the invention is not limited to the exemplary embodiments which are shown.

The invention claimed is:

1. A turbine blade for a turbine, comprising:
a blade wall;
a first passage for guiding a first medium;
a second passage for guiding a second medium that is fed to the turbine blade separately from the first medium;
a chamber arranged on the blade wall and connected to the first passage and the second passage that mixes the first medium and the second medium to form a mixture; and
an outlet line connected to the chamber that discharges the mixture from the chamber into a hot gas space; and
an insert arranged in the blade wall that at least partially delimits the chamber and the outlet line.

2. The turbine blade as claimed in claim 1, wherein the blade wall in a surface facing the hot gas space comprises a recess for inserting the insert corresponding to a contour of the recess.

3. The turbine blade as claimed in claim 2, wherein the contour of the recess is rectangular or circular.

4. The turbine blade as claimed in claim 1, wherein the outlet line comprises a swirl element.

5. The turbine blade as claimed in claim 1, further comprising a plurality of chambers connected to a plurality of outlet lines respectively.

6. The turbine blade as claimed in claim 5, wherein each of the chambers and each of the outlet lines connected to the each of the chambers is delimited by a separate insert.

7. The turbine blade as claimed in claim 5, wherein a group of chambers and a group of the outlet lines connected to the group of chambers is delimited by a separate insert.

8. The turbine blade as claimed in claim 1, wherein the insert comprises a plurality of outlet lines.

9. The turbine blade as claimed in claim 1, wherein the insert comprises a plurality of sections.

10. The turbine blade as claimed in claim 1, wherein the insert comprises a plurality of stacked layer elements.

11. The turbine blade as claimed in claim 1, wherein the insert comprises a porous material or foam on a hot gas side.

12. The turbine blade as claimed in claim 1, wherein the outlet line leads to a region of the blade wall where a shock waves occurring in a hot gas impacts.

13. The turbine blade as claimed in claim 1, further comprising a blade airfoil comprising a suction-side blade wall and a pressure-side blade wall.

14. The turbine blade as claimed in claim 13, wherein the blade wall extends along a chord and a length of the chord is from a leading edge of the blade airfoil to a trailing edge of the blade airfoil.

15. The turbine blade as claimed in claim 14, wherein the outlet line leads to a surface of the suction-side blade wall in a rear third of the chord length in a flow direction of a hot gas flowing around the blade airfoil.

16. The turbine blade as claimed in claim 1, wherein a basic body of the blade wall is casted.

17. The turbine blade as claimed in claim 16, wherein the insert is welded or soldered to the basic body.

18. A gas turbine with a turbine blade, comprising:
a blade wall;
a first passage for guiding a first medium;
a second passage for guiding a second medium that is fed to the turbine blade separately from the first medium;
a chamber arranged on the blade wall and connected to the first passage and the second passage that mixes the first medium and the second medium to form a mixture; and
an outlet line connected to the chamber that discharges the mixture from the chamber into a hot gas space; and
an insert arranged in the blade wall that at least partially delimits the chamber and the outlet line.

\* \* \* \* \*